United States Patent [19]

Pearson et al.

[11] Patent Number: 5,433,553
[45] Date of Patent: Jul. 18, 1995

[54] METHOD FOR REFUSE DISPOSAL IN SOLUTION-MINED SALT CAVITIES

[75] Inventors: Arthur G. A. Pearson, 9712-93 Avenue, Fort Saskatchewan, Alberta, Canada, T8L 1N2; Arvid Alseth, Edmonton, Canada

[73] Assignee: Arthur G. A. Pearson, Fort Saskatchewan, Canada

[21] Appl. No.: 154,564

[22] Filed: Nov. 19, 1993

[51] Int. Cl.6 .................................................. B09B 3/00
[52] U.S. Cl. ..................................... 405/59; 405/128; 588/250
[58] Field of Search ............... 405/128, 129, 258, 52, 405/59; 588/250

[56] References Cited

U.S. PATENT DOCUMENTS

| | | | |
|---|---|---|---|
| 4,576,513 | 3/1986 | Lindorfer et al. | 588/250 X |
| 4,692,061 | 9/1987 | Lindorfer et al. | 588/250 |
| 5,314,265 | 5/1994 | Perkins et al. | 588/250 X |

OTHER PUBLICATIONS

Paper entitled Process for Refuse Disposal in Solution-Mined Salt Cavities by Z. W. Rogers, Jr. presented to the Fourth International Symposium on Salt—Northern Ohio Geological Society in 1968.

*Primary Examiner*—Dennis L. Taylor
*Attorney, Agent, or Firm*—Anthony R. Lambert

[57] ABSTRACT

A method for Refuse Disposal in Solution-Mined Salt Cavities is described. Firstly, crush municipal refuse to a particulate size of less than one inch. Secondly, compact a mixture of particulate refuse and brine into cakes less than one inch in thickness at densities in excess of 77 pounds per cubic foot. Thirdly, mix the cakes with brine to form a slurry with a minimum volume ratio of 2 portions brine to 1 portion cakes. Fourthly, inject the slurry into a brine filled salt cavity, whereby the cakes, being denser than the brine, settle to the bottom of the salt cavity.

2 Claims, 1 Drawing Sheet

METHOD FOR REFUSE DISPOSAL IN SOLUTION-MINED SALT CAVITIES

The present invention relates to a method for Refuse Disposal in Solution-Mined Salt Cavities.

BACKGROUND OF THE INVENTION

The concept of refuse disposal in solution-mined salt cavities was introduced by Z. W. Rogers Jr. in a paper entitled "Process for Refuse Disposal in Solution-Mined Salt Cavities" delivered to the Fourth International Symposium on Salt—Northern Ohio Geological Society in 1968. The proposed process involved the steps of conveying refuse through a reclamation and shredding facility, and then dropping the refuse down a large diameter disposal shaft extending from the groundsurface to the top of the salt cavity. A small diameter shaft was to be provided for ventilating the cavity during disposal operations. The internal pressure of the cavity was preferably atmospheric to allow the introduction of refuse into the cavity in the most direct manner possible.

In his paper Rogers also discussed what he termed "alternate disposal techniques". Two alternate techniques were discussed under this heading, one being the production of a water based slurry from the refuse and the other being pressurizing the cavity. He viewed the slurry approach as being the more "inefficient" method as there would be no "compaction due to refuse overburden". He also noted that the extraction of brine to accommodate the addition of refuse slurry would present problems of possible plugging. He suggested that a method of addressing there apparent problems would be to extract the brine from within a gravel packed sump at the base of the cavity and then running the brine through a settling pond or centrifuge.

The teachings of Rogers have been successfully applied with contaminated soil such as drill cuttings produced by the oil industry. The contaminated soils are mixed into a slurry with a salt water brine and then injected into a salt cavity. This technique has been successful due to the fact that contaminated soil has a specific gravity per cubic foot which exceeds that of the brine. The heavier contaminated soil component settles to the bottom of the salt cavity permitting the brine to be drawn away from the top of the cavity and recycled.

The problems envisaged by Rogers with respect to the slurry method still serve as an impediment from applying these techniques to municipal refuse. Municipal refuse is not a homogeneous product, as is contaminated soil. A large proportion of municipal refuse consists of matter, such as wood and paper, that has a specific gravity of less than brine. Matter with a specific gravity of less than brine will not settle to the bottom of the cavity, and as such creates serious problems with brine circulation.

SUMMARY OF THE INVENTION

What is required is a method for Refuse Disposal in Solution-Mined Salt Cavities which is suitable for use with municipal refuse.

According to the present invention there is provided a method for Refuse Disposal in Solution-Mined Salt Cavities which includes the following steps. Firstly, crush municipal refuse to a particulate size of less than one inch. Secondly, compact a mixture of particulate refuse and brine into cakes less than one inch in thickness at densities in excess of 77 pounds per cubic foot. Thirdly, mix the cakes with brine to form a slurry with a minimum volume ratio of 2 portions brine to 1 portion cakes. Fourthly, inject the slurry into a brine filled salt cavity, whereby the cakes, being denser than the brine, settle to the bottom of the salt cavity.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
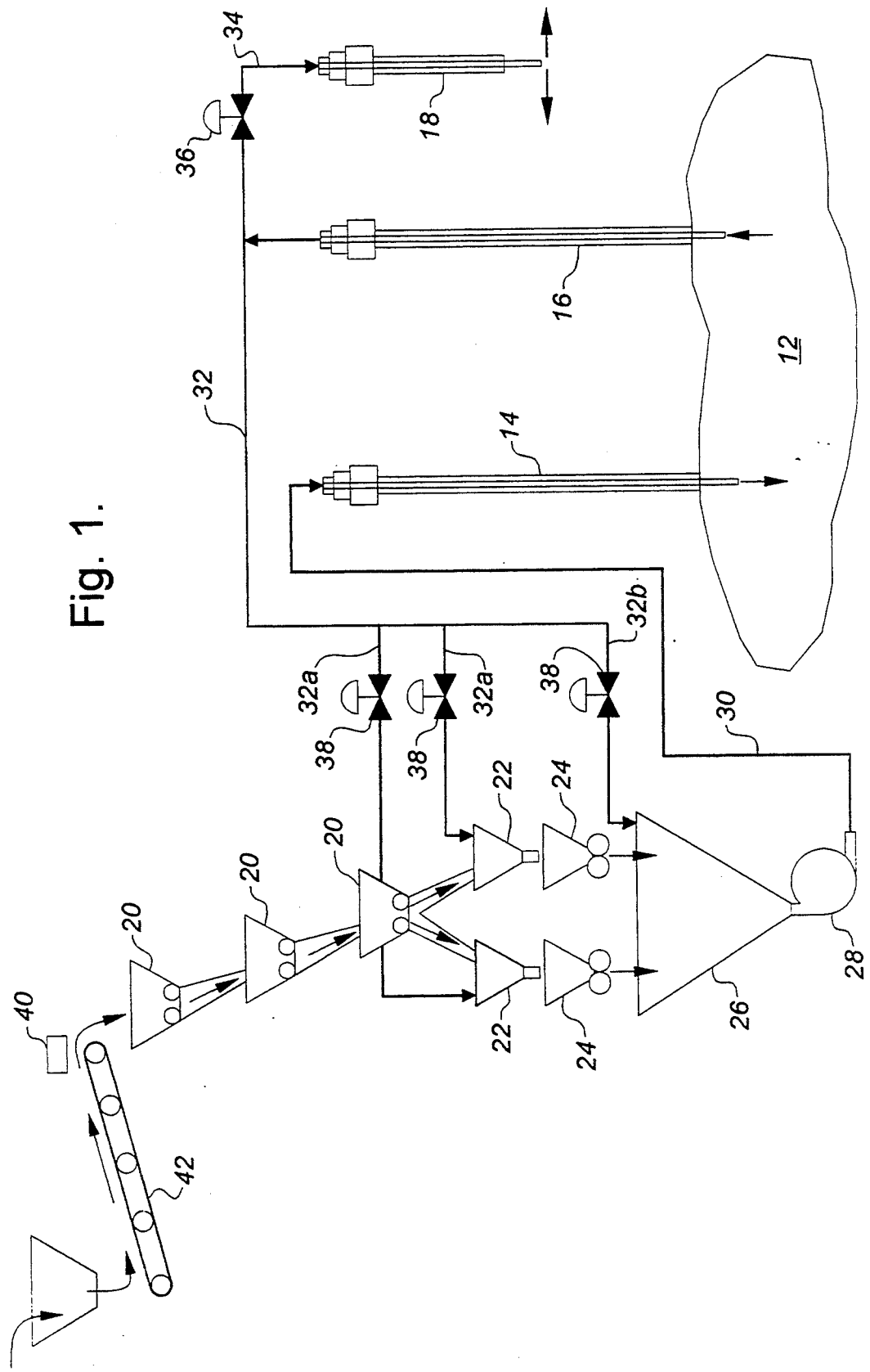
FIGURE 1 is a diagram illustrating the preferred method.

The preferred method for Refuse Disposal in Solution-Mined Salt Cavities will now be described with reference to FIGURE 1.

Referring to FIGURE 1, there is illustrated a solution-mined salt cavity 12 having a slurry injection inlet shaft 14, a brine return outlet shaft 16, and an excess brine disposal shaft 18. A series of flow lines are connected to the shafts 14, 16, and 18 as will hereinafter be further described. The steps of the method will now be described. Firstly, crush refuse to a particulate size of less than one inch. In order to accomplish this there is illustrated in FIGURE 1 as series of crushers 20. Each crusher 20 crushes material into progressively smaller particles until a particulate size of less than one inch is attained. The preferred particulate size is approximately ⅜ths of an inch. As the particulate refuse leaves the last of crushers 20 it is directed into a mixing tank 22 in preparation for the second step. Secondly, compact a mixture of particulate refuse and brine into cakes less than one inch in thickness at densities in excess of 77 pounds per cubic foot. This is accomplished through the use of a compactors 24. The brine content in the cakes must be at least twenty percent (20%). Best results were obtained with a brine content of approximately forty percent (40%). The cakes leaving compactors 24 are discharged into feed hopper 26 in preparation for the third step. Thirdly, mix the cakes with brine to form a slurry with a minimum volume ratio of 2 portions brine to 1 portion cakes. Feed hopper 26 discharges into pump 28 in preparation for the fourth and final step. Fourthly, inject the slurry by means of pump 28 through an injection flow line 30 to inlet shaft 14 discharging the cakes into brine filled salt cavity 12. The cakes, being denser than the brine, settle to the bottom of salt cavity 12. The cakes displace brine which is removed from salt cavity 12 via brine return outlet shaft 16. From brine return outlet shaft 16 a portion of the brine is recycled via recycling flow line 32 and any excess brine is routed through excess brine flow line 34 where it is injected into a disposal zone through excess brine disposal shaft 18. A control valve 36 is placed at the junction of recycling flow line and excess brine flow line 34 to control the proportion of brine being recycled and disposed of as excess. Recycling flow line 32 diverges into branches 32a and 32b connected into mixing tank 22 and feed hopper 26, respectively. Control valves 38 on branches 32a and 32b control the relative flow of brine into mixing tank 22 and feed hopper 26.

It is desirable to take certain precautions by way of precrush treatment of certain materials to ensure crushers 20 is not damaged. Car bodies, rubber tires and reinforced concrete are the types of materials for which it is desirable to have a precrush treatment. It is also desirable to remove tramp iron through the use of a magnetic head 40 suspended over a feed conveyer 42 which feeds crushers 20. There may be crushers capable of taking the materials to the desired particulate size in one operation. More typically, however, a series of crushers are used with each crusher reducing particular size. It is critical to the described method that a density in excess of 77 pounds per cubic foot be achieved, for 77 pounds per cubic foot is the specific density of brine. Any matter of a density of less than 77 pounds per cubic foot will not settle out of the brine and will contaminate the brine return stream flowing up through outlet shaft 16. The settling of the cakes clarifies the brine. The clarified brine is then withdrawn through outlet shaft 16 and recycled. When the refuse is styrofoam, bits of plastic, and other matters which are particularly light; it is recommended that sand be mixed with the light matter during compaction to ensure the desired density is reached.

There are two cautionary notes that must be raised. Firstly, some gases and lighter than brine materials, such as fats and oils, will be released and will float to the top of salt cavity 12. This problem can be addressed by providing inlet shaft 14 and outlet shaft 16 with liner casings and extending the liner casings into salt cavity 12 for a distance of approximately 30 feet. The lighter than brine materials will rise up an annular space around the liner casings to the surface where they may be directed to a flare or removed for disposal in some other fashion. Secondly, a compaction force of approximately 3500 pounds per square inch is required to create cakes of the desired density in excess of 77 pounds per cubic foot. The cakes are maintained under pressure of approximately that amount during the process of injection into salt cavity 12 by the weight of the continuous column of slurry positioned in inlet shaft 14. If the pressure upon the cakes were to be released, there would be a tendency for them to expand. For this reason, it is preferable to maintain continuous pressure upon salt cavity 12, even when salt cavity 12 is full. This can be done through a column of liquid, or by other means.

The described method was perfected through experimentation. In perfecting this method a great deal was learned about what would not work. It was discovered that mixing dry refuse with brine was not feasible as it took time for the dry refuse to become saturated. With dry refuse, notwithstanding compaction, air was trapped in some of the refuse causing it to rise to the surface. After compaction the dry refuse was formed into sheets and had to be broken into smaller sizes with equipment known as "flake breakers". Care had to be taken to ensure that "flake breakers" broke the refuse into consistent sizes so that pumps used to pump the refuse into the salt cavity were not damaged. Working with wet and pliable cakes proved to be much superior. They are immediately ready for injection into the salt cavity. They do not require special equipment to break them into manageable sizes, and are pliable enough that they do not damage the pumps.

It will be apparent to one skilled in the art that modifications may be made to the illustrated embodiment without departing from the spirit and scope of the method as defined by the claims.

The embodiments of the invention in which an exclusive property or privilege is claimed are defined as follows:

1. A method for Refuse Disposal in Solution-Mined Salt Cavities, comprising the steps of:
    providing a solution-mined salt cavity containing brine and having an inlet shaft and an outlet shaft;
    providing a heterogeneous mixture of refuse including materials that float on brine;
    crushing the refuse to a particulate size of less than one inch;
    compacting a mixture of particulate refuse and brine into cakes less than one inch in thickness at densities in excess of 77 pounds per cubic foot;
    mixing the cakes with brine with a minimum volume ratio of 2 portions brine to 1 portion cakes;
    injecting the cakes mixed with brine through the inlet shaft into the brine filled salt cavity, whereby the cakes, being denser than the brine, settle to a bottom of the salt cavity; and
    recycling the brine from the salt cavity by drawing the brine through the outlet shaft for mixing with more of the refuse.

2. The method as defined in claim 1, wherein the mixture of particular refuse and brine has at least 20 percent brine.

* * * * *